United States Patent [19]

Espenmiller

[11] 4,272,315
[45] Jun. 9, 1981

[54] SECONDARY FIBER SYSTEM

[75] Inventor: Howard P. Espenmiller, Middletown, Ohio

[73] Assignee: The Black Clawson Company, Middletown, Ohio

[21] Appl. No.: 22,101

[22] Filed: Mar. 20, 1979

Related U.S. Application Data

[63] Continuation of Ser. No. 667,675, Mar. 17, 1976, abandoned.

[51] Int. Cl.³ .......................... D21B 1/32; D21B 1/34
[52] U.S. Cl. .......................................... 162/4; 162/28; 241/21; 241/24; 241/28; 241/29; 241/69; 241/78; 241/79.2; 241/80
[58] Field of Search ........................ 162/4, 28, 55, 264; 209/273; 241/21, 24, 28, 29, 46.11, 46.17, 69, 78, 79.2, 80

[56] References Cited

U.S. PATENT DOCUMENTS

| | | | |
|---|---|---|---|
| 2,796,807 | 6/1957 | Sanford | 241/80 X |
| 3,339,851 | 9/1967 | Felton et al. | 241/46.17 |
| 3,549,092 | 12/1970 | Baxter, Jr. | 241/24 X |
| 3,595,488 | 7/1971 | Blakely | 241/21 |
| 3,736,223 | 5/1973 | Marsh | 162/4 |
| 3,873,410 | 3/1975 | Chupka | 162/4 |
| 3,970,548 | 7/1976 | Siefert et al. | 209/273 X |
| 4,105,543 | 8/1978 | Siefert | 209/273 X |

Primary Examiner—Richard V. Fisher
Attorney, Agent, or Firm—Biebel, French & Nauman

[57] ABSTRACT

Waste paper containing materials, e.g. commercial "waste paper", are treated for recovery of reusable paper therefrom by slushing in a pulper from which two fractions are continuously extracted—a first fraction through small holes, e.g. 3/16 inch in diameter, and a second fraction through substantially larger holes, e.g. 1 inch in diameter. The second fraction is screened, preferably after a centrifugal cleaning operation, in a screen having small perforations sized to accept only substantially defibered paper, and the accepts flow is mixed directly with the first extracted fraction. The reject flow from this screen is conducted, with or without an intermediate deflaking operation, to a tailing screen from which the accepts are recycled to the pulper and the rejects are eliminated from the system. Major advantages of this method and system include the continuous elimination of plastic and other floating trash from the pulper, a high degree of essentially complete defibering in the pulper, and minimal recycling of adequately defibered stock.

8 Claims, 1 Drawing Figure

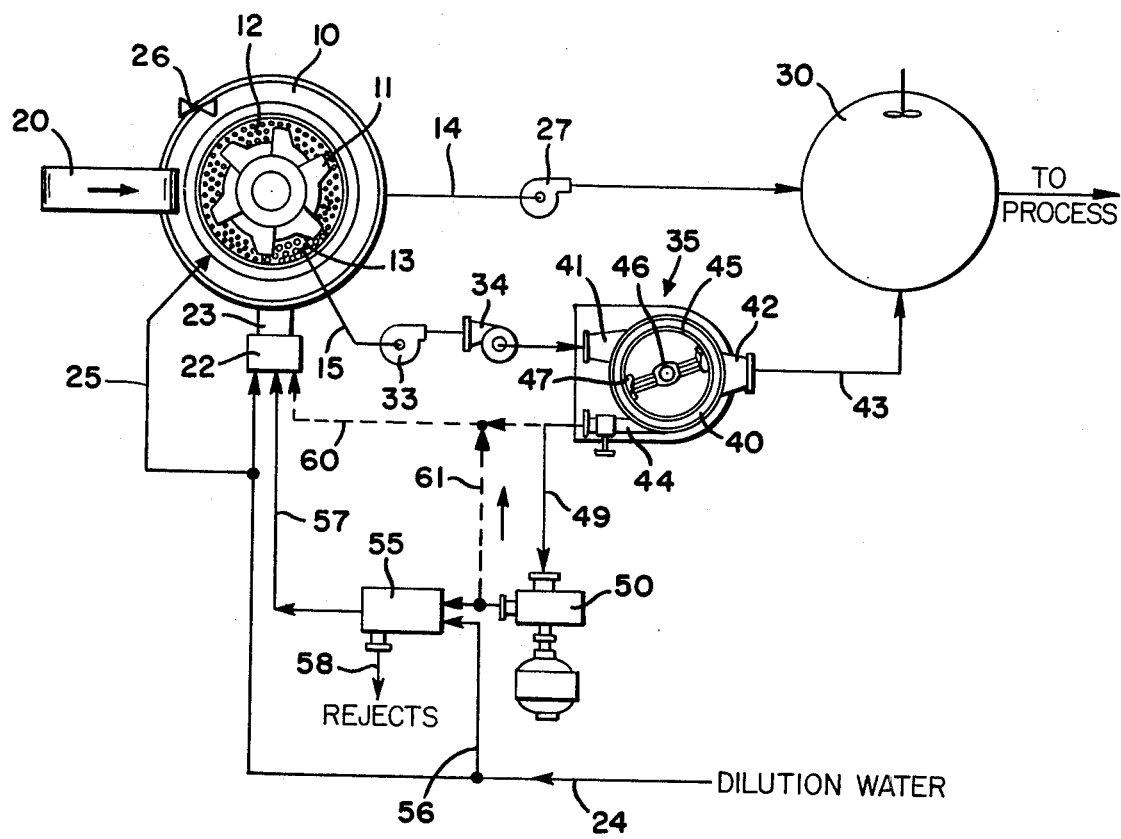

SECONDARY FIBER SYSTEM

RELATED APPLICATION

This application is a continuation of application Ser. No. 667,675, filed Mar. 17, 1976, now abandoned.

BACKGROUND OF THE INVENTION

Waste papers have for many years been an important source of fiber for use, or rather for reuse, in the manufacture of new paper products, and waste paper materials of a variety of types and grades are recognized commodities for purchase by paper and paper board mills. There has in recent years been increasing emphasis on such recycling of used paper materials, and this emphasis has now extended to the recovery of reusable paper fiber from municipal solid waste, by means of the system and method of disclosed in my assignee's recent U.S. Pat. No. 3,736,223.

The recycling of commercially available waste paper has always presented some problems of cleaning and screening because the economics of collecting, sorting and baling of used paper products commonly result in the inclusion of substantial quantitites of inorganic contaminants as well as plastic, rags and the like. The high specific gravity contaminants of waste paper mixtures are not difficult to separate from the paper, by conventional junk removers and centrifugal cleaners. The more serious problems derive from the plastic and other trash materials which have specific gravities so close to that of cellulose fiber that gravity separation is not effective, and which now commonly average from 3–5% to as high as 15% by weight of commercial waste paper.

More specifically, pulpers which are commonly used for initially breaking down waste paper are quite efficient for slushing but less so for complete defibering, and much longer pulping time is required if the pulper is relied upon to reduce the paper to particle sizes capable of passage through relatively small holes, e.g. ⅜ inch in diameter or less. Under such conditions, however, the plastic constitutents of the mix will not be correspondingly reduced in particle size, and they will tend to accumulate in the pulper, and to interfere with proper extraction of the defibered paper. This in turn will result in such loss in the effectiveness of the pulper that frequent stops for cleaning out the pulper become necessary.

When attempts were made in the past to avoid this problem by the use of larger extraction holes from the pulper, other difficulties resulted. For example, since a portion of the paper charge is not completely defibered, many paper pieces will be comparable in size to the fragments of plastic and cannot readily be separated by screening. This problem can be overcome by subjecting the mixed fibers and fragments to treatment in apparatus of the type known as deflakers which will defiber the paper without comparable reduction of the particle sizes of the plastic, but such treatment is inefficient because the defibering apparatus must handle both the plastic, the paper pieces, and the already defibered paper, with resulting wasteful consumption of power.

The most effective system and method previously developed for dealing with this problem are disclosed in my assignee's U.S. Pat. No. 3,873,410 (Chupka). According to that patent, the different stations in the system are so arranged that the pulper is utilized only for slushing rather than for complete defibering of the paper, the slushed and centrifugally cleaned slurry is then screened at high consistency and with a high reject rate to separate such paper as has been essentially defibered from the plastic and remaining paper, and the material rejected by the screen is then directed to a deflaker from which the accepted material is recycled in the system.

SUMMARY OF THE INVENTION

In a system according to U.S. Pat. No. 3,873,410, the pulper is provided with extraction plate holes of relatively large diameter, typically one inch or more, and the entire output of extracted stock is subjected to a fine screening operation which accepts the fully defibered material. All of the reject material, which includes substantial quantities of good fiber, is defibered in a deflaker and then screened in a tailing screen, from which the accepted stock is either returned to the supply line to the initial screening station or back to the pulper. This system and method have proved to be definitely superior to previous approaches to the problem, especially for recovering fiber from municipal solid waste.

The present invention provides improvements and advantages over the system and method of U.S. Pat. No. 3,873,410 while retaining all of the advantages which that patent taught over the previous art. More specifically, this invention derives from recognition that a substantial portion of any given charge of waste paper furnish to a pulper will be substantially completely defibered relatively quickly, and with much lower power requirements, than all of the paper in the charge, if provision is made for continuously removing plastic and other lightweight trash which can interfere with efficient pulping and extraction.

The corollary of this principle of the invention is that whenever a pulper is equipped with sufficiently large extraction holes for continuous removal of the lightweight trash, a substantial quantity of essentially defibered paper will be entrained therewith, and will therefore be subjected to whatever defibering operation is carried out thereafter. In addition to possible over-refining, this tends to diminish the efficiency of the deflaker, to the extent that it is forced to work on material which needs no further defibering.

In accordance with the invention, the pulper is equipped with two separate extraction plate areas having materially differently sized holes. One area has relatively small holes, preferably in the range of ⅛–⅜ inch and typically 3/16 inch in diameter, and it communicates with an extraction chamber from which stock is continually drawn to a chest of suitable size for surge capacity. The other area has substantially larger holes, preferably in the range of ½ to 2 inches in diameter and typically 1 inch in diameter, and it communicates with a separate extraction chamber.

The first fraction of stock, which is extracted through the small size extraction holes, will consist primarily of essentially defibered paper and a minimum of plastic and other floating trash. The second fraction will also include a substantial quantity of good fiber, in both fully and incompletely defibered form, but it will contain the major proportion of plastic sheet or film and other light and/or floating trash. Preferably the sizes of the holes in the second extraction plate will be such as to promote extraction of the light trash on a continuous basis so that it does not clog the pulper or unnecessarily load the rotor.

This second fraction is desirably first subjected to centrifugal cleaning to eliminate high specific gravity contaminants, and it is then screened in a screen having perforations of no bigger, and preferably somewhat smaller, size than the small extraction holes in the pulper, i.e. perforations in the range of 1/16-3/16 inches and typically ⅛ inch in diameter. The stock accepted by this screen will comprise primarily essentially defibered paper material, and it is therefore conducted to the same chest as the stock extracted through the first extraction plate, for mixture therewith.

The material rejected by the screen will include substantially all of the light trash from the pulper, but it also will include a considerable quantity of reclaimable but still undefibered paper material. It may be delivered to a deflaker for further defibering action, with the output of the deflaker being supplied to a tailing screen having holes of relatively larger size than those of the first screen and intermediate the sizes of the small and large extraction holes in the pulper, preferably in the range of ¼ to ½ inches in diameter. The stock accepted by this screen is recycled to the pulper, and the reject from the screen, which is almost entirely plastic and other light trash, may be discarded. Alternatively, the deflaker may be omitted from the system, in which case the screen will still be used in the same way to separate the light trash and return the reclaimable paper material to the pulper.

The advantages of this system and method over U.S. Pat. No. 3,873,410 include the fact that the majority of the extraction plate area can be devoted to small holes for extraction of stock which requires no further defibering. At the same time, the large hole extraction system provides for continuous purging of the pulper of light trash which would otherwise tend to interfere with the small hole extraction. In addition, with only a minor portion of extraction plate area having large holes, the flow to the first screen is correspondingly reduced, as well as the load on the deflaker if one is used, and in either case, recirculation of defibered stock to the pulper is reduced to a minimum. This all results in increased efficiency at each station and an overall higher production rate of usable fiber.

BRIEF DESCRIPTION OF THE DRAWING

The single FIGURE is a flow diagram illustrating an apparatus system embodying and for carrying out the process of the invention.

DESCRIPTION OF THE PREFERRED EMBODIMENT

The major piece of equipment in the system shown in the drawing is a pulper comprising a treatment vessel or tub 10 wherein a rotor 11 rotates above an extraction area composed of a plate 12 provided with holes of relatively of small size, namely in the range of ⅛-⅜ inch in diameter, and a second plate 13 provided with substantially larger holes, namely in the range of ½ to 2 inches in diameter. As shown, the plate 12 is of substantially larger area than plate 13 and may advantageously occupy as much as 90% of the total extraction area. Each of the plates 12 and 13 communicates with a separate extraction chamber therebelow, and each of these extraction chambers is in turn provided with its own discharge line 14 and 15 respectively.

A conveyor 20 carries the waste paper material to the tub 10, and it is to be understood that this charge may be selected from the full range of waste paper containing materials from commercial "waste paper" to municipal solid waste. A junk remover 22 is positioned adjacent the tub and communicates therewith through a conduit 23. Water is continuously supplied to the tub by a line 24 through the junk remover 22 and its connecting conduit 23 into the tub as well as over the tub side through line 25.

Preferred examples of pulpers suitable for use in this station include those shown in Felton et al U.S. Pat. No. 3,339,851 and Blakley et al U.S. Pat. No. 3,595,488, and details of the junk remover are shown in Baxter U.S. Pat. No. 3,549,092. The essential characteristics of the pulper are that it be capable of subjecting mixed waste paper materials and water to forces of mechanical and hydraulic shear and mechanical impact which will quickly and effectively reduce the solid material in the tub to fragments capable of passage through the perforations in extraction plate 12. Normally the pulper will be equipped with a ragger 26, also as shown in U.S. Pat. No. 3,549,092, for removing stringy materials, large sheets of plastics, and the like.

The pulper 10 operates continuously, with additional waste paper and water being added at rates which will maintain the solids content (consistency) of the mixture in the desired range, 2 to 8% being practical and 3 to 5% being preferred for practical reasons. A first fraction slurry of water and defibered paper of sufficiently small size to pass through the small holes in extraction plate 12 is continuously withdrawn from the associated extraction chamber through line 14 by a pump 27 and supplied to a surge tank 30, from which the stock is processed further through the necessary cleaning and fine screening as desired in accordance with conventional practice. A second fraction slurry of water and fragmentary material which passes through the larger perforations in plate 13 is continuously withdrawn through line 15 by a pump 33, and if this slurry contains a significant amount of high specific gravity contaminants such as metal and glass, it is preferably delivered by pump 33 to a centrifugal cleaner 34 for removing the high specific gravity contaminants to simplify the subsequent screening as well as to prevent possible damage to the screen.

The cleaned slurry from the cleaner 34 will contain a considerable proportion of relatively large undefibered pieces of paper as well as pieces of plastic and the like of comparable size, but when the initial pulping operation is carried out in a pulper of the characteristics noted above, the result will also be that a substantial proportion of the paper which has been substantially completely defibered will be extracted with the light trash through plate 13. This slurry is therefore subjected to a screening operation in a screen 35 which will result in acceptance of at least the majority of the substantially completely defibered paper, and the rejection of the undefibered paper fragments, plastic and other pieces of reject material.

Highly successful results have been obtained in the practice of the invention with the screen 35 constructed in my assignee's U.S. Pat. Nos. 4,105,543 (Seifert) and 3,970,548 (Chupka and Seifert). The screen 35 is accordingly shown as comprising a main housing 40 having a tangential inlet port 41 at the upper end thereof, an outlet port 42 for accepted stock from which a line 43 leads to the surge tank 30, and a discharge port 44 for reject stock.

Within the housing 40 is a screen cylinder 45, and a rotor 46 operates within the cylinder 40 and carries vanes 47 spaced inwardly from the surface of the screen cylinder. For the purposes of the invention, the perforations in the screen cylinder 45 should be sized to accept only substantially defibered paper and particles of similar sizes. Satisfactory results have been obtained in the practice of the invention with a screen constructed as described wherein these perforations are smaller than the holes in extractor plate 12, namely in the range of approximately 1/16 to 3/16 inch in diameter and preferably ⅛ inch.

The reject flow from screen 35 will therefore contain the relatively minor amount of undefibered pieces of paper and substantially all of the plastic and other light trash. This reject flow is shown as conducted by line 49 to a deflaker 50 of any satisfactory construction such, for example, as a disk refiner, and the flow from the deflaker 50 is supplied to a tailing screen 55 of any suitable type for separating the deflaked fiber and small undefibered prices of paper from the larger pieces of plastic and other light trash. For example, the screen 55 may be a vibrating flat bed screen of the Jonsson type with perforations larger than screen 35 and intermediate the sizes of the small and large extraction holes in the plates 12 and 13, e.g. ¼ to ½ inch in diameter. The water necessary for operation of screen 55 is supplied by a branch 56 from the water line 24 to the pulper.

Since a part of the accepts flow from the screen 55 requires further pulping, it is returned at 57 to the pulper tub 10, and the reject is discharged at 58. It should be noted that use of the deflaker is optional. For some installations it may be omitted, and the reject line 49 from screen 35 may be connected directly to the tailing screen 55, with the accepts flow recirculated from screen 55 to the pulper tub for the necessary further defibering.

A major advantage of this invention is the provision it makes for operating each piece of apparatus in the system at the proper balance of load and efficiency. For example, in a typical 300 ton per day system, the flow of essentially defibered stock extracted through the small hole plate 12 will average 265 tons at 3% consistency, while the flow of trash-carrying stock extracted through the large hole plate 13 and delivered to the screen 35 will average 145 tons at the same consistency. The screen 35 will therefore be required to handle only about 35% of the total flow of extracted stock.

The accepts flow from screen 35 will average 75 tons per day, at approximately 2.7% consistency, leaving only about 70 tons at 3.4% consistency for handling by the deflaker 50 and/or the tailing screen 35. On the average, approximately 15 to 20% of the flows from the tailing screen will be reject, with the remainder being recirculated to the pulper. It should also be noted that if the deflaker or tailing screen lacks the capacity to handle the full flow of reject from the screen 35, that flow can be split accordingly, with the surplus being recirculated to the pulper tub 10, as indicated by the broken line 60 and 61. In the subsequent repulping, a major amount of the recycled paper fragments will be sufficiently defibered for acceptance by the small hole extraction plate 12 or the screen 55, correspondingly reducing the loads on the deflaker and tailing screen. Thus, with either arrangement, each piece of equipment is required to handle only that portion of the total load which requires the operation of that equipment, which promotes efficient operation as well as minimal operating cost and wear on the equipment.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. The method of treating waste paper materials containing plastic and other floatable trash to recover paper fibers therefrom for reuse which comprises the steps of:
    (a) supplying said materials and water to a vessel at rates maintaining the consistency of the resulting suspension in the range of approximately 2–8% solids content,
    (b) continuously pulping said suspension in said vessel to reduce said materials to fragments,
    (c) continuously extracting from said vessel a first fraction slurry comprising liquid and only such of said fragments as pass through holes of sufficiently small size to accept only fragments of the size of substantially defibered paper, said small holes being in the range of substantially ⅛ to 3/16 inch in diameter,
    (d) continuously extracting from said vessel a separate second fraction slurry comprising liquid and such of said fragments as pass through holes sufficiently larger than said small extraction holes to pass pieces of partially defibered paper and correspondingly sized pieces of floating trash, said larger holes being in the range of substantially ½ to 1 inch in diameter
    (e) cleaning said second extracted fraction by removal of high specific gravity contaminants therefrom,
    (f) screening said cleaned fraction through small perforations of a size not larger than said small extraction holes,
    (g) mixing the accepted stock from said screening step with said first extracted fraction,
    (h) screening the rejected stock from said screening step through perforations of a size intermediate the sizes of said small and large extraction holes, and
    (i) recycling the accepted stock from said second screening step to said vessel.

2. The method as defined in claim 1 wherein the first said screening step is through perforations of a size smaller than said small extraction holes.

3. The method as defined in claim 1 wherein said small screening perforations are in the range of 1/16 to 3/16 inch in diameter, and said intermediate size perforations are in the range of ¼ to ½ inch in diameter.

4. The method as defined in claim 1 further comprising the step of subjecting the rejected stock from the said first screening step to a defibering action, and screening said defibered stock through said intermediate size perforations.

5. Apparatus for treating waste paper materials containing plastic and other floatable trash to recover paper fibers therefrom for reuse, comprising:
    (a) pulping means including a tub,
    (b) means for supplying said materials and water to said tub at rates maintaining the consistency of the resulting suspension in the range of approximately 2–8% solids content,
    (c) means for continuously pulping said suspension in said tub to reduce said materials to fragments,
    (d) a first extraction plate in said tub having small holes therethrough sized to pass only fragments of the size of substantially defibered paper, said small holes being in the range of substantially ⅛ to 3/16 inch in diameter, (e) means for continuously withdrawing from said tub through said first extraction plate holes a first fraction slurry comprising liquid and only such of said fragments as pass through said small extraction plate holes, (f) a second extraction plate in said tub having holes therethrough sufficiently larger than said small holes sized to pass partially defibered pieces of paper and correspondingly sized pieces of floating trash, said larger holes being in the range of substantially ½ to 1 inch in diameter (g) means for continuously extracting from said tub through said second extraction plate holes a second fraction slurry comprising liquid and such of said fragments as pass through said larger holes, (h) centrifugal cleaner means connected to receive said second extracted fraction and to remove high specific gravity contaminants therefrom, (i) screen means connected to receive the resulting cleaned fraction and having small perforations of a size not larger than said small extraction holes, (j) means for mixing the accepted stock from said screen means with said first extracted fraction, (k) a second screen connected to receive the materials rejected by said screen means and having perforations of a size intermediate the size of said small and large extraction holes, and (l) means for recycling the accepted stock from said second screen to said tub.

6. Apparatus as defined in claim 5 wherein said small screen perforations are smaller than said small extraction holes.

7. Apparatus as defined in claim 5 wherein said small size extraction holes are substantially 3/16 inch in diameter, said larger extraction holes are substantially 1 inch in diameter, said small screen perforations are in the range of 1/16 to 3/16 inch in diameter, and said intermediate size perforations are in the range of ¼ to ½ inch in diameter.

8. Apparatus as defined in claim 5 further comprising defibering means connected to receive the materials rejected by said screen means, and means conducting the resulting defibered materials to said second screen.

* * * * *